United States Patent [19]

Kutschi

[11] Patent Number: 5,785,303
[45] Date of Patent: Jul. 28, 1998

[54] SPRING CORE FOR MATTRESS OR SEAT CUSHION

[76] Inventor: Franz Kutschi, Sportplatzstrasse 16., D-8580 Koeflach, Austria

[21] Appl. No.: 694,751

[22] Filed: Aug. 9, 1996

Related U.S. Application Data

[63] Continuation of Ser. No. 398,313, Mar. 3, 1995, abandoned.

[51] Int. Cl.⁶ .............................. F16F 3/00; A47C 23/02; A47C 7/02
[52] U.S. Cl. .................... 267/103; 267/86; 267/107; 267/160; 267/165; 5/476; 297/452.49
[58] Field of Search .................... 267/80, 81, 83, 267/86, 93, 103, 107, 110, 111; 5/247, 255, 476; 297/452.49, 452.53

[56] References Cited

U.S. PATENT DOCUMENTS

| | | |
|---|---|---|
| 1,630,459 | 5/1927 | Zeidler .............................. 267/80 |
| 2,277,853 | 3/1942 | Kohn ................................. 5/476 |
| 2,313,171 | 3/1943 | Piliero ............................... 5/247 |
| 3,879,025 | 4/1975 | Dillard ............................. 267/165 |
| 3,974,532 | 8/1976 | Ecchuya ............................ 5/448 |
| 4,682,378 | 7/1987 | Savenije ........................... 5/239 |
| 4,713,854 | 12/1987 | Graebe ............................. 5/481 |
| 4,935,977 | 6/1990 | Yamada .......................... 567/148 |
| 5,409,200 | 4/1995 | Zingher et al. .................. 267/160 |

*Primary Examiner*—Chris Schwartz
*Attorney, Agent, or Firm*—Fulbright & Jaworski LLP

[57] ABSTRACT

This invention relates to a spring core of leaf springs for mattresses and seat cushions. According to the invention, the spring core comprises at least two plates opposite each other, having a multiplicity of spring elements broken out of holes. Preferably, the spring elements of the opposite plates are mirror-images.

22 Claims, 2 Drawing Sheets

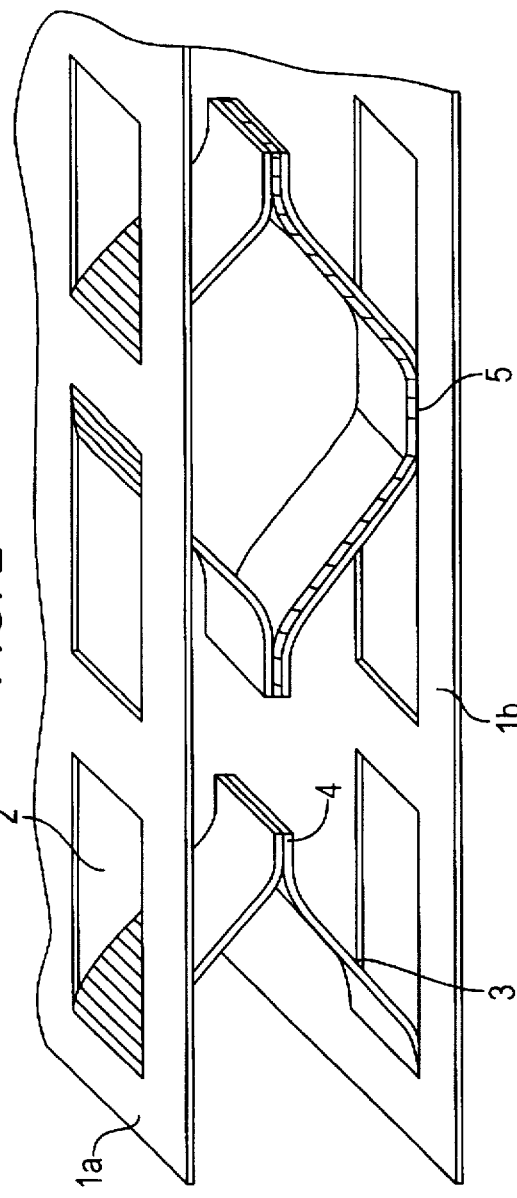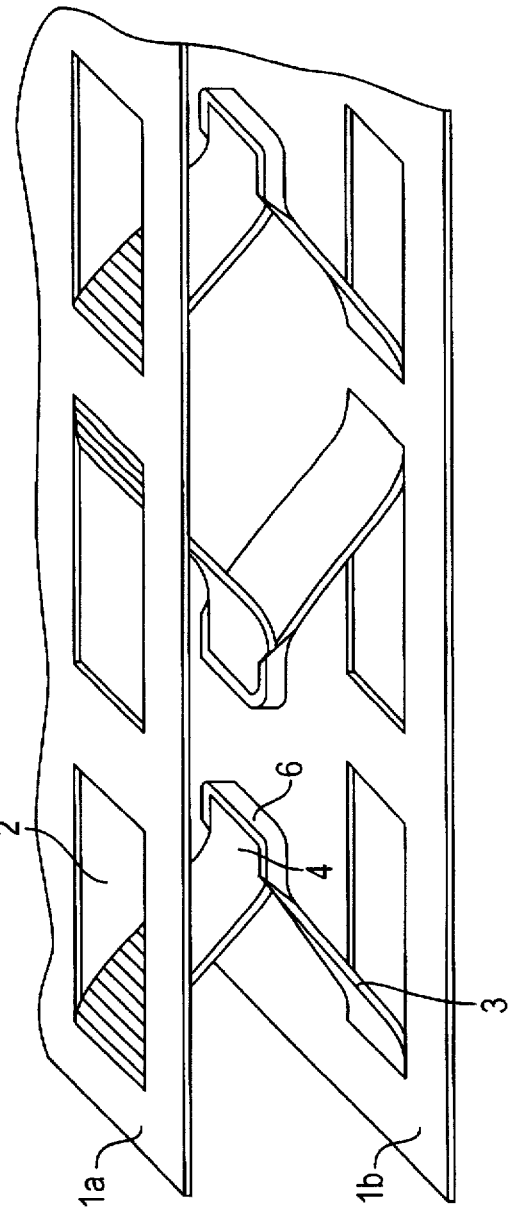

SPRING CORE FOR MATTRESS OR SEAT CUSHION

This is a continuation division of application Ser. No. 08/398,313, filed Mar. 3, 1995 abandoned.

BACKGROUND OF THE INVENTION

1. Field of the Invention

This invention relates to a spring core for mattresses and seat cushions with leaf springs.

2. Discussion of the Related Art

Spring cores made with spiral springs for mattresses and seat cushions are known. Such spring cores, which are known in a variety of forms, are not corrosion resistant. These spring cores can only be made of spring steel and not of plastics, and therefore are expensive.

The use in mattresses and seat cushions of inserts made of synthetic foam, natural fibers, and other elastic filling materials in place of springs is also known. These known inserts have the disadvantage of very poor air circulation and consequent trapping of moisture, as well as early fatigue and consequent deformation of the insert material.

SUMMARY OF THE INVENTION

The objects of the present invention are to provide a spring core that can be made from plastics and also allow a sufficient circulation of air.

BRIEF DESCRIPTION OF THE DRAWINGS

FIG. 2 is a schematic representation of an embodiment of the spring core including reinforcement in places subject to heavy wear.

FIG. 3 is a schematic representation of an embodiment of the spring core with sockets.

DETAILED DESCRIPTION OF THE PREFERRED EMBODIMENTS

Figure 1:
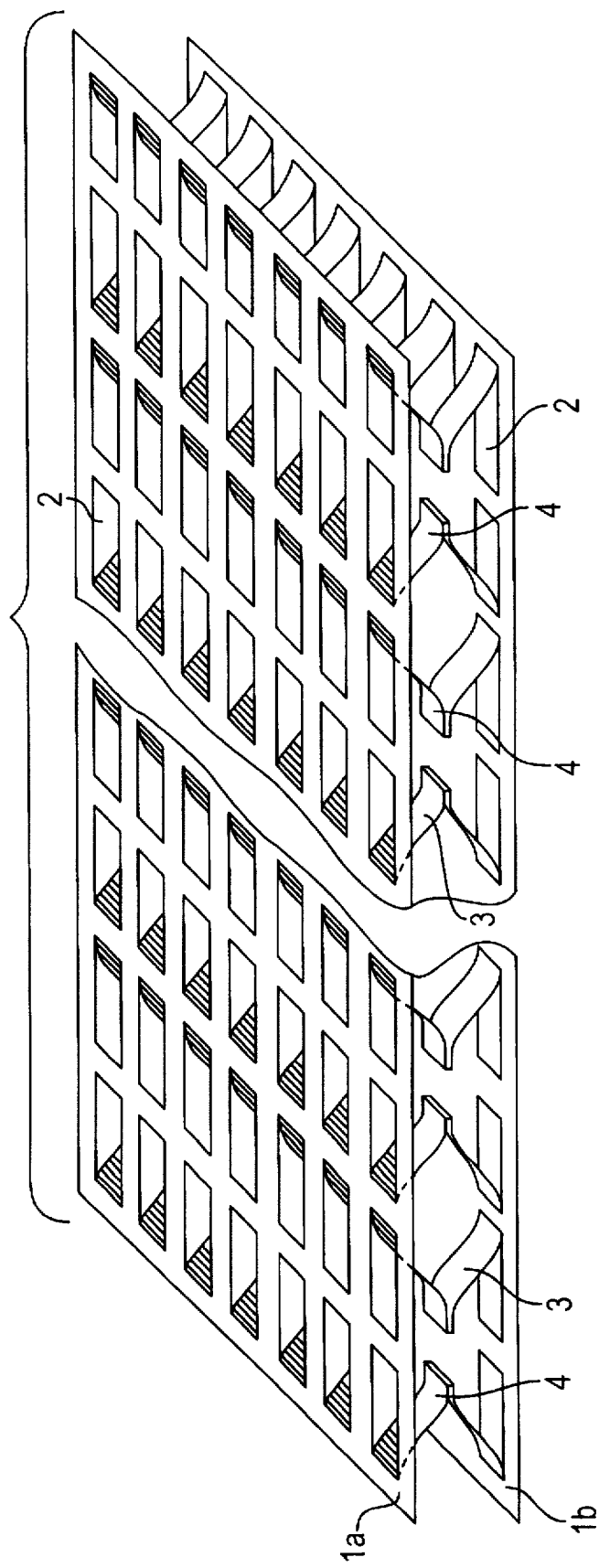
FIG. 1 is a schematic representation of an embodiment of the spring core.

FIG. 1 shows a spring core in which two mirror-image plates 1a, 1b are opposite each other, each having spring elements 3 broken and bent out of openings 2. The spring elements 3 are, by way of example, arranged symmetrically and in line. Preferably, the plates 1a, 1b are made from a fiber-reinforced plastic. It can further be seen that, as a result of the mirrorimage construction and arrangement of the spring elements 3, a multitude of leaf spring systems with movable supports 4 is formed, which do not transfer possible lateral displacements of the movable supports 4 to the surroundings.

In an advantageous embodiment, a spring core is reinforced in places subject to especially heavy wear by insertion of reinforcement spring elements. FIG. 2 shows a spring core much like that of FIG. 1, however, FIG. 2 includes reinforcement spring elements 5. FIG. 3 shows a spring core much like that in FIG. 1, however, FIG. 3 includes socket 6 at the edge of moveable supports 4 so as to center the opposing plate 1a on the bottom plate 1b.

The objects of the invention are achieved in that the spring core comprises at least two plates arranged opposite each other. Each plate is broken out to form a multitude of spring elements. The spring elements of opposing plates are mirror-images of each other. This construction and arrangement of the spring cores results in a multitude of leaf spring systems with movable supports which do not transfer a lengthwise displacement of the supporting points to the cushion material.

This construction results in the special advantages in that a large supporting surface is provided for the cushion material which may form a covering, and that air can circulate very well through the breaches. In an especially advantageous embodiment of the invention, the ends of the spring elements of a plate are shaped as sockets with edges formed so as to center the opposing plate. In a further especially advantageous embodiment of the invention, the plates are preferably made from a fiber-reinforced plastic, resulting in an up-to-date corrosion-resistant and lightweight spring core.

We claim:

1. A spring core for a mattress or seat-cushion consisting of:

two plates, each of said plates having spring elements bent out of a multiplicity of openings, wherein the spring elements of one plate oppose spring elements of an opposite plate.

2. The spring core according to claim 1 wherein spring elements of one plate are bent as mirror-images of spring elements of an opposite plate.

3. The spring core according to claim 2 wherein ends of spring elements of one plate are shaped as sockets with edges formed so as to center an opposite plate.

4. The spring core according to claim 3 wherein the plates are made of a fiber-reinforced plastic.

5. The spring core according to claim 4 wherein the spring core is reinforced in places subject to especially heavy wear by insertion of reinforcement spring elements.

6. The spring core according to claim 2 wherein the plates are made of a fiber-reinforced plastic.

7. The spring core according to claim 6 wherein the spring core is reinforced in places subject to especially heavy wear by insertion of reinforcement spring elements.

8. The spring core according to claim 2 wherein the spring core is reinforced in places subject to especially heavy wear by insertion of reinforcement spring elements.

9. A spring core for a mattress or seat-cushion comprising:

at least two plates, each plate having rows and columns of spring elements bent out of a multiplicity of openings, wherein the spring elements of one plate oppose spring elements of an opposite plate.

10. The spring core according to claim 9 wherein spring elements of one plate are bent as mirror-images of spring elements of an opposite plate.

11. The spring core according to claim 10 wherein ends of spring elements of one plate are shaped as sockets with edges formed so as to center an opposite plate.

12. The spring core according to claim 11 wherein the plates are made of a fiber-reinforced plastic.

13. The spring core according to claim 12 wherein the spring core is reinforced in places subject to especially heavy wear by insertion of reinforcement spring elements.

14. The spring core according to claim 10 wherein the plates are made of a fiber-reinforced plastic.

15. The spring core according to claim 14 wherein the spring core is reinforced in places subject to especially heavy wear by insertion of reinforcement spring elements.

16. The spring core according to claim 10 wherein the spring core is reinforced in places subject to especially heavy wear by insertion of reinforcement spring elements.

17. A spring core for a mattress or seat-cushion comprising:

at least two plates, each of said plates having spring elements bent out of a multiplicity of openings, wherein the spring elements of one plate oppose spring elements of an opposite plate, and are bent as mirror-images of spring elements of an opposite plate and wherein ends of spring elements of one plate are shaped as sockets with edges formed so as to center an opposite plate.

18. The spring core according to claim 17 wherein the plates are made of a fiber-reinforced plastic.

19. The spring core according to claim 18 wherein the spring core is reinforced in places subject to especially heavy wear by insertion of reinforcement spring elements.

20. The spring core according to claim 17 wherein the plates are made of a fiber-reinforced plastic.

21. The spring core according to claim 20 wherein the spring core is reinforced in places subject to especially heavy wear by insertion of reinforcement spring elements.

22. The spring core according to claim 17 wherein the spring core is reinforced in places subject to especially heavy wear by insertion of reinforcement spring elements.

* * * * *